Dec. 26, 1939.   J. P. LAWLOR   2,184,618
AUTOMATIC BACKWASH FILTER CONTROL
Filed Nov. 15, 1937

INVENTOR.
J. P. LAWLOR
BY
M. Talbert Dick
ATTORNEY.

Patented Dec. 26, 1939

2,184,618

UNITED STATES PATENT OFFICE 2,184,618

AUTOMATIC BACKWASH FILTER CONTROL

Joseph P. Lawlor, Ames, Iowa

Application November 15, 1937, Serial No. 174,534

6 Claims. (Cl. 210—147)

The principal object of my invention is to provide an apparatus for use in combination with filters and the like that will automatically cause the filter to be backwashed for eliminating accumulated impurities in the filter after the filter has collected and retained a predetermined amount of impurities.

A further object of this invention is to provide an automatic backwash filter control apparatus that permits adjustment as to the duration of the backwashed time.

A still further object of my invention is to provide an automatic apparatus for controlling the flow of the fluid in both directions through a filter that is highly efficient in operation, economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Figures 1, 2:
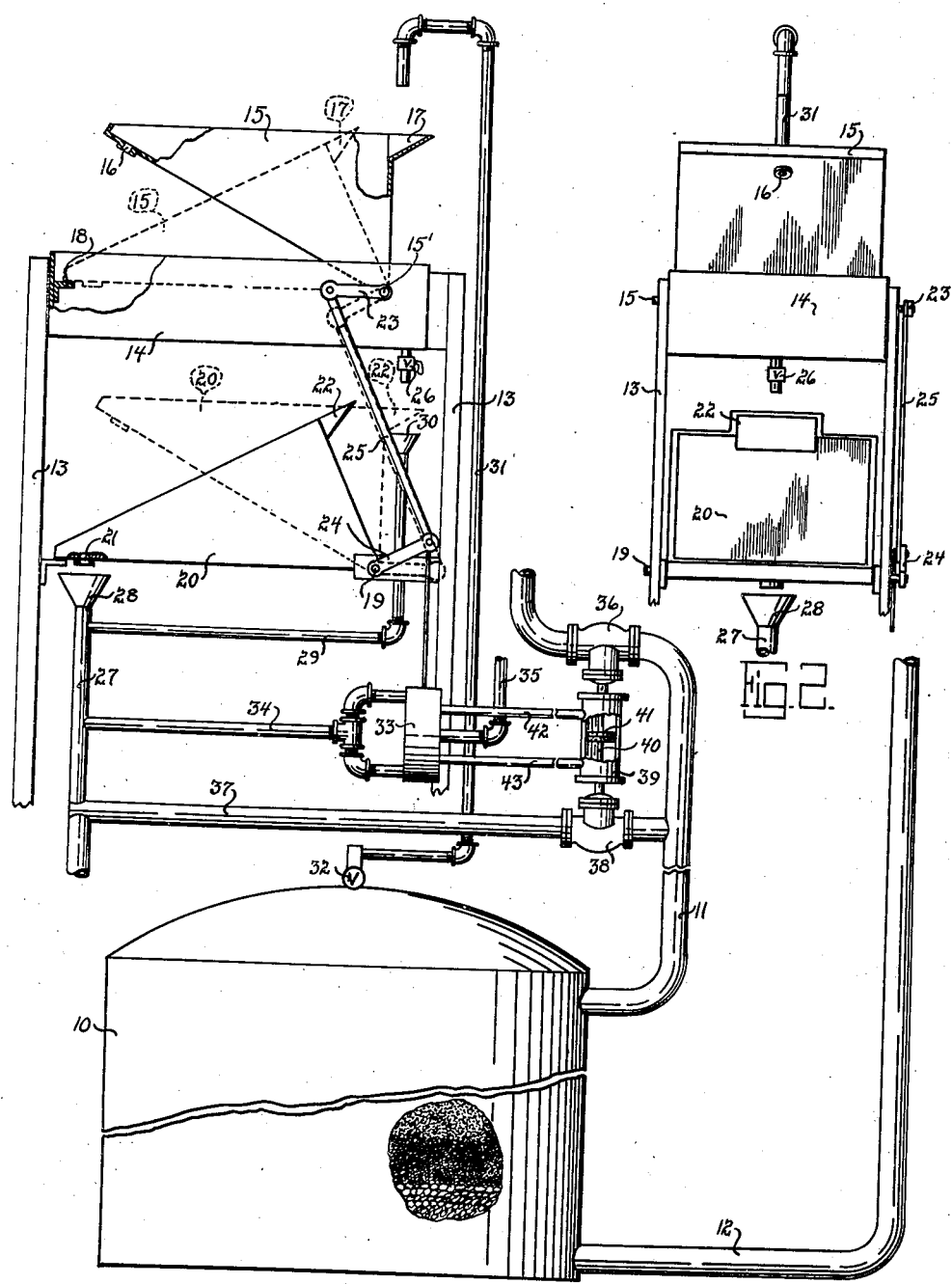
Fig. 1 is a side view of my complete apparatus installed and ready for use.
Fig. 2 is a front view of my device and more fully illustrates its construction.

As is well known, filters become clogged and fouled from use and it is necessary to backwash them from time to time to maintain any worthwhile efficiency. It is quite easy to cause the backwashing of filters by manual manipulation of valves or by predetermined timing devices that will periodically cause the filter to be backwashed. Obviously, however, a filter may quickly accumulate impurities or it may require a considerable length of time to accumulate sufficient impurities before a backwash is needed. With automatic timing devices or by manual operated means, filters may need cleaning long before they are backwashed, or on the other hand may not need cleaning at the time they are backwashed. I have overcome such objections by providing a non-complicated apparatus for use in combination with filters that will automatically cause the filter to be backwashed at the moment a predetermined amount of sludge or impurities have been accumulated in the filter.

Referring to the drawing, I have used numeral 10 to designate in conventional form an ordinary filter having an inlet pipe 11 communicating with its inside top and an outlet pipe 12 communicating with its inside bottom. By the construction and arrangement of parts shown in my drawing, this pipe 12 is designed to lead to an elevated supply tank such as a stand pipe or other means for maintaining fluid under pressure inside the pipe 12 regardless of the direction of flow of the fluid through the filter. I have used the numeral 13 to designate the frame portion of my device. The numeral 14 designates a tank secured to the upper portion of the frame 13 and resting in a horizontal plane. The numeral 15' designates a shaft rotatably extending through the rear side portion of the tank 14 as shown in Fig. 1. The numeral 15 designates my upper tipping tray rigidly secured by any suitable means at its rear bottom end to the shaft 15'. This tipping tray 15 has its rear lower end within the tank 14 and when in normal upright position as shown in Fig. 1 has its bottom extending upwardly and forwardly. The numeral 16 designates an outlet port in the bottom of the tipping tray 15 near its forward bottom end. The numeral 17 designates a liquid receiving and guiding cup flange on the rear top end of the tray 15 and communicating with the inside of the tipping tray. The numeral 18 designates a stop in the forward end portion of the tank 14 for limiting the downward movement of the forward end of the tray 15 within the tank 14 when the tray is moved to a lowered position as shown by dotted lines in Fig. 1. When the tray 15 is in such lowered position, its bottom will be substantially horizontal. The numeral 19 designates a shaft rotatably mounted in the frame 13 and positioned in a plane directly below the plane of the shaft 15'. The numeral 20 designates my second tipping tray which is an exact duplicate of the tipping tray 15. This tray 20 also has an outlet port 21 and a liquid receiving and guiding element 22. The rear lower end of this second tray 20 is rigidly secured by any suitable means to the shaft 19. The numeral 23 designates an arm rigidly secured at one end to the shaft 15' and extending forwardly. The numeral 24 designates a similar arm rigidly secured at one end to the shaft 19 and extending rearwardly. When the trays 15 and 20 are in elevated positions, their arms 23 and 24 extend horizontally. The numeral 25 designates a link rod having one end pivoted to the free end of the arm 23 and its other end pivoted to the free end of the arm 24. The length of this rod arm 25 is such that when the tipping tray 15 is in elevated position, the arm 23 will be in a horizontal position and the tipping tray 20 will be in a lowered position and the arm 24 will extend upwardly and rearwardly. Likewise when the tray 15 is in a lowered position the arm 23 will extend downwardly and forwardly and the tipping tray 20 will be in an elevated position and the arm 24 will be in a horizontal plane. The numeral 26 designates a manually adjustable valve communicating with the inside rear bottom of the tank 15 and capable of emptying directly into the portion 22 of the tray 20 when the tray 20 is in an elevated position as shown by dotted lines in Fig. 1. The numeral 27 designates a drain pipe having a funnel 28 for receiving liquid directly from the outlet opening 21 of the tray 20 when the tray 20 is in a lowered position. The numeral 29 designates a pipe communicating with the inside of the waste pipe 27. The numeral 30 designates a funnel on the outer end of the pipe 29 located directly below the valve 26 and below the portion 22 of the tray 20 when the tray 20 is in an elevated position. The numeral 31 designates a vertical pipe communicating with the inside top of the filter 10 and discharging at a point directly above the portion 17 of the tray 15 when the tray 15 is in an elevated position. This pipe 31 extends to an elevation substantially above the filter 10 and has embossed in its length an ordinary adjustable yielding valve 32 shown in conventional form in Fig. 1. This valve 32 yieldingly closes communication between the inside of the pipe 21 and the inside of the filter 10. The numeral 33 designates an ordinary four-way valve shown in conventional form and having its operating rod rigidly secured to the rear end of the arm 24. The numeral 34 designates the waste water pipe communicating with the inside of the four-way valve 33. The numeral 35 designates the fluid inlet pipe designed to be in communication with a source of liquid under pressure. In general practice, this pipe 35 may be connected with and communicate inside with the pipe 11 any point previous of the gate valve 36 imposed in the pipe 11. The numeral 37 designates a pipe having one end communicating inside with the pipe 11 at a point past the gate valve 36 and its other end communicating inside with the drain pipe 27. The numeral 38 designates a gate valve imposed in the pipe 37 and arranged diametrically opposite from the gate valve 36 as shown in Fig. 1. The numeral 39 designates a cylinder positioned between the gate valves 36 and 38. The numeral 40 designates a shaft extending completely through the enclosed cylinder 39 and connected to the gate valves 36 and 38. The numeral 41 designates a piston rigidly secured to the shaft 40 and positioned inside the cylinder 39. The numeral 42 designates a pipe having one end communicating with the inside of the four-way valve 33 and its other end communicating with the inside of the cylinder 39 and one side of the piston 41. The numeral 43 designates a second pipe communicating the one end with the inside of the four-way valve 33 and its other end communicating with the inside of the cylinder 39 at a point on the other side of the piston 41.

The practical operation of this device is as follows:

Normally water or other liquid will pass through the open gate valve 36, pipe 11 and into the filter 10 from which it will flow through the pipe 12. After the filter begins to accumulate sufficient impurities to impair its efficiency, head pressure will be accordingly built up within the upper portion of the filter thereby opening the valve 32 and rising and passing from the pipe 31 into the tipping tray 15. Obviously the greater amount of collected impurities inside the filter, the greater will be the head pressure and any desired moment of backwashing relative to the amount of accumulated impurities may be had by adjusting the adjustable pressure valve 32. In some cases it may be desirable to dispense with the valve 32 entirely and the increased head pressure within the filter caused by impurities will cause the water to rise within the pipe 31 and into the tray 15. When sufficient water has been disposed within the tipping tray 15, it will become overbalanced at its forward end and will automatically and quickly fall to a horizontal position as shown by dotted lines in Fig. 1. Considerable quantity of water must be in the tray before it does move to a lowered position and when it once starts to such lowered position, its movement will be rapid and definite due to its sloping bottom approaching a horizontal position. Due to the linkage between the tray 15 and the tray 20, the downward movement of the tray 15 will raise the empty lower tray 20 to an elevated position. With the tray 15 in a lowered position, the collected water will pass through the opening 16 and into the tank 14. From the tank 14 the water will pass through the valve 26 into the tray 20. Up to the downward movement of the tray 15 the gate valve 36 will be open and the gate valve 38 closed. The four-way valve will be so positioned that the pipe 35 will be in communication with the upper end of the cylinder 39 and the pipe 43 will be in communication with the drain outlet pipe 34. However upon the movement of the tray 15 to a downward position, the four-way valve 33 will be changed and the pipe 35 will be in communication with the lower end of the cylinder 39 and the pipe 42 will be in communication with the drain outlet pipe 34. With water under pressure below the piston 41 the gate valve 36 will be closed and the gate valve 38 opened. By the pipe 42 being in communication with the pipe 34, the water above the piston may escape as the piston moves upwardly. With the gate valve 36 closed and the gate valve 38 opened, the water or other liquid being purified will reverse its flow, pass downwardly through the pipe 12 into the bottom of the filter. From the bottom of the filter it will pass upwardly and out through the open gate valve 38 to the drain pipe 27 to backwash the filter. As soon as sufficient water has passed from the tank 14 into the tray 20, the tray 20 will move to a lowered position thereby raising the tray 15 to its normal upright position. This reverses the four-way valve 33 and water under pressure will pass into the upper portion of the cylinder 39 thereby forcing the piston 41 downwardly to open the gate valve 36 and close the gate valve 38. The pipe 43 will be in communication with the pipe 34 to permit the escape of water below the piston 41. At this time the filter will assume its normal operation. When the tray 20 is in lowered position, collected water will pass from it into the funnel 28. Any continued drippings from the valve 26 will fall into the funnel 30. The length of time of the backwash will depend upon the length of time for sufficient water to pass into the tray 20 and tip it. This time element may be adjustably controlled by the manually operated valve 26.

Some changes may be made in the construction and arrangement of my improved automatic backwash filter control without departing from the real spirit and purpose of my invention, and it is my intention to cover by my claims any modified forms of structure or use of mechanical

I claim:

1. In a control apparatus, a frame, a tank secured to said frame, a tipping tray pivotally supported at one of its lower ends above the bottom of said tank, an outlet passageway in said tipping tray capable of directing a liquid into said tank when said tipping tray is in a lowered tipped position, a second tipping tray pivotally supported at one of its lower ends below the bottom of said tank, an outlet passageway in said second tipping tray capable of directing liquid from said second tipping tray when said second tipping tray is in a lowered tipped position, an arm operatively rigidly secured to said mentioned tipping tray, an arm operatively rigidly secured to said second tipping tray, a connecting member having one end pivotally secured to said first mentioned arm and its other end pivotally secured to said last mentioned arm, an operating shaft operatively connected to one of said arms, an outlet passageway in said tank capable of directing liquid into said second mentioned tipping tray when said tipping tray is in an upright position, and a means terminating above said first mentioned tray when said tray is in an upright position for furnishing a liquid to said first mentioned tray.

2. In a control apparatus a frame, a tank secured to said frame, a tipping tray pivotally supported above the bottom of said tank capable of being overbalanced when a liquid is placed in it and moved from an upright position to a lowered tipped position, an outlet passageway in said tipping tray capable of directing liquid within it into said tank when said tipping tray is in a lowered tipped position, a second tipping tray pivotally supported below the bottom of said tank capable of being moved to a lowered tipped position from an elevated position when liquid is placed in it, an outlet passageway in said second tipping tray capable of directing liquid from said tray when said tray is in a lowered position, an arm operatively rigidly secured to said tipping tray extending in a horizontal plane when said tipping tray is in an elevated position, an arm operatively rigidly secured to said second tipping tray extending in a horizontal plane when said tipping tray is in an elevated position, a connecting member having one end pivotally secured to said first mentioned arm and its other end pivotally secured to said last mentioned arm, an operating shaft operatively connected to one of said arms, an outlet passageway in said tank capable of directing liquid into said second mentioned tipping tray when said tipping tray is in an upright position, and a pipe capable of furnishing a liquid to said first mentioned tray when said first mentioned tray is in an upright position.

3. In a control apparatus a frame, a tank secured to said frame, a tipping tray pivotally supported above the bottom of said tank capable of being overbalanced when a liquid is placed in it and moved from an upright position to a lowered tipped position, an outlet passageway in said tipping tray capable of directing liquid within it into said tank when said tipping tray is in a lowered tipped position, a second tipping tray pivotally supported below the bottom of said tank capable of being moved to a lowered tipped position from an elevated position when liquid is placed in it, an outlet passageway in said second tipping tray capable of directing liquid from said tray when said tray is in a lowered position, an arm operatively rigidly secured to said tipping tray extending in a horizontal plane when said tipping tray is in an elevated position, an arm operatively rigidly secured to said second tipping tray extending in a horizontal plane when said tipping tray is in an elevated position, a connecting member having one end pivotally secured to said first mentioned arm and its other end pivotally secured to said last mentioned arm, an operating shaft operatively connected to one of said arms, an adjustable outlet passageway in said tank capable of directing liquid into said second mentioned tipping tray when said tipping tray is in an upright position, and a means terminating above said first mentioned tray when the same is in an upright position for furnishing a liquid to said first mentioned tray when the same is in an upright position.

4. In a control apparatus, a frame, a tank secured to said frame, a tipping tray pivotally supported at one of its lower ends above the bottom of said tank, having its bottom extending upwardly and outwardly when it is in an elevated position, a liquid supply pipe terminating above said tray when said tray is in an elevated position; said supply pipe designed to be in communication with the inside top of a liquid container, an outlet passageway in said tipping tray capable of directing a liquid into said tank when said tipping tray is in a lowered tipped position, a second tipping tray pivotally supported at one of its lower ends below the bottom of said tank, having its bottom extending upwardly and outwardly when it is in an elevated position, an outlet passageway in said second tipping tray capable of directing liquid from said second tipping tray when said second tipping tray is in a lowered tipped position, an arm operatively rigidly secured to said mentioned tipping tray, an arm operatively rigidly secured to said second tipping tray, a connecting member having one end pivotally secured to said first mentioned arm and its other end pivotally secured to said last mentioned arm a liquid supply pipe designed to be in communication with the inside of a liquid container, an operating shaft operatively connected to one of said arms, a multi-passageway valve connected to said shaft and imposed in said last mentioned liquid supply pipe.

5. In combination with a filter having inlet and outlet pipes, a control apparatus comprising a frame, a tank secured to said frame, a tipping tray pivotally supported at one of its lower ends above the bottom of said tank, having its bottom extending upwardly and outwardly when it is in an elevated position, an outlet passageway in said tipping tray capable of directing a liquid into said tank when said tipping tray is in a lowered tipped position, a second tipping tray pivotally supported at one of its lower ends below the bottom of said tank, having its bottom extending upwardly and outwardly when it is in an elevated position, an outlet passageway in said second tipping tray capable of directing liquid from said second tipping tray when said second tipping tray is in a lowered tipped position, an arm operatively rigidly secured to said mentioned tipping tray, an arm operatively rigidly secured to said second tipping tray, a connecting member having one end pivotally secured to said first mentioned arm and its other end pivotally secured to said last mentioned arm, valves imposed in said filter inlet pipe, an operating shaft connected to one of said arms operatively connected to said valves in said inlet pipe for causing the opening and closing of the same, and a pipe communicating with the inside top of said filter and terminating above said first mentioned tipping tray when said tipping tray is in an elevated position.

6. In combination with a filter having inlet and outlet pipes, a control apparatus comprising a frame, a tank secured to said frame, a tipping tray pivotally supported at one of its lower ends above the bottom of said tank, having its bottom extending upwardly and outwardly when it is in an elevated position, an outlet passageway in said tiping tray capable of directing a liquid into said tank when said tipping tray is in a lowered tipped position, a second tipping tray pivotally supported at one of its lower ends below the bottom of said tank, having its bottom extending upwardly and outwardly when it is in an elevated position, an outlet passageway in said second tipping tray capable of directing liquid from said second tipping tray when said second tipping tray is in a lowered tipped position, an arm operatively rigidly secured to said mentioned tipping tray, an arm operatively rigidly secured to said second tipping tray, a connecting member having one end pivotally secured to said first mentioned arm and its other end pivotally secured to said last mentioned arm, valves imposed in said filter inlet pipe, an operating shaft connected to one of said arms operatively connected to said valves in said inlet pipe for causing the opening and closing of the same, a pipe communicating with the inside top of said filter and terminating above said first mentioned tipping tray when said tipping tray is in an elevated position, and an adjustable pressure actuated valve imposed in said last mentioned pipe.

JOSEPH P. LAWLOR.